United States Patent
Chen et al.

(10) Patent No.: US 9,977,560 B2
(45) Date of Patent: May 22, 2018

(54) TOUCH CONTROL STRUCTURE AND LIQUID CRYSTAL DISPLAY HAVING THE TOUCH CONTROL STRUCTURE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Gui Chen, Guangdong (CN); Caiqin Chen, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 151 days.

(21) Appl. No.: 14/904,760

(22) PCT Filed: Sep. 28, 2015

(86) PCT No.: PCT/CN2015/090976
§ 371 (c)(1),
(2) Date: Jan. 13, 2016

(87) PCT Pub. No.: WO2017/045226
PCT Pub. Date: Mar. 23, 2017

(65) Prior Publication Data
US 2017/0235394 A1    Aug. 17, 2017

(30) Foreign Application Priority Data

Sep. 15, 2015 (CN) .......................... 2015 1 0584850

(51) Int. Cl.
*G06F 3/047* (2006.01)
*G06F 3/041* (2006.01)
*G02F 1/1333* (2006.01)

(52) U.S. Cl.
CPC .......... *G06F 3/047* (2013.01); *G02F 1/13338* (2013.01); *G06F 3/0412* (2013.01); *G06F 3/0416* (2013.01)

(58) Field of Classification Search
CPC .................................................. G02F 1/13338
See application file for complete search history.

(56) References Cited

U.S. PATENT DOCUMENTS 8,754,662 B1   6/2014 Weng et al.
2013/0257794 A1   10/2013 Lee et al.
(Continued)

FOREIGN PATENT DOCUMENTS

CN    104461187 A    3/2015
CN    104615322 A    5/2015
(Continued)

*Primary Examiner* — Ryan A Lubit
(74) *Attorney, Agent, or Firm* — Andrew C. Cheng

(57) ABSTRACT

The present invention provides a touch control structure, comprising a touch control zone, and the touch control zone comprises touch control units and first lead wires corresponding to the touch control units, and the touch control units are arranged in array having a plurality of column of the touch control units, and the touch control units of each column are aligned in spaces from top to bottom in the touch control structure, and the first lead wires sequentially penetrate the touch control units in each column from top to bottom in the touch control structure, and the first lead wire is electrically coupled to one touch control unit, and is disconnected with the next touch control unit, which is adjacent to the touch control unit in the same column and close to the top of the touch control structure.

11 Claims, 1 Drawing Sheet

(56) References Cited

U.S. PATENT DOCUMENTS

| | | | |
|---|---|---|---|
| 2015/0002421 A1 | 1/2015 | Kim et al. | |
| 2015/0277635 A1* | 10/2015 | Kim | G06F 3/047 |
| | | | 345/173 |
| 2016/0098143 A1* | 4/2016 | Kida | G06F 3/041 |
| | | | 345/174 |
| 2016/0357337 A1* | 12/2016 | Li | G06F 3/044 |
| 2017/0045985 A1* | 2/2017 | Lv | G06F 3/044 |

FOREIGN PATENT DOCUMENTS

| | | |
|---|---|---|
| CN | 104834123 A | 8/2015 |
| CN | 104881170 A | 9/2015 |
| JP | H06224401 A | 8/1994 |

\* cited by examiner

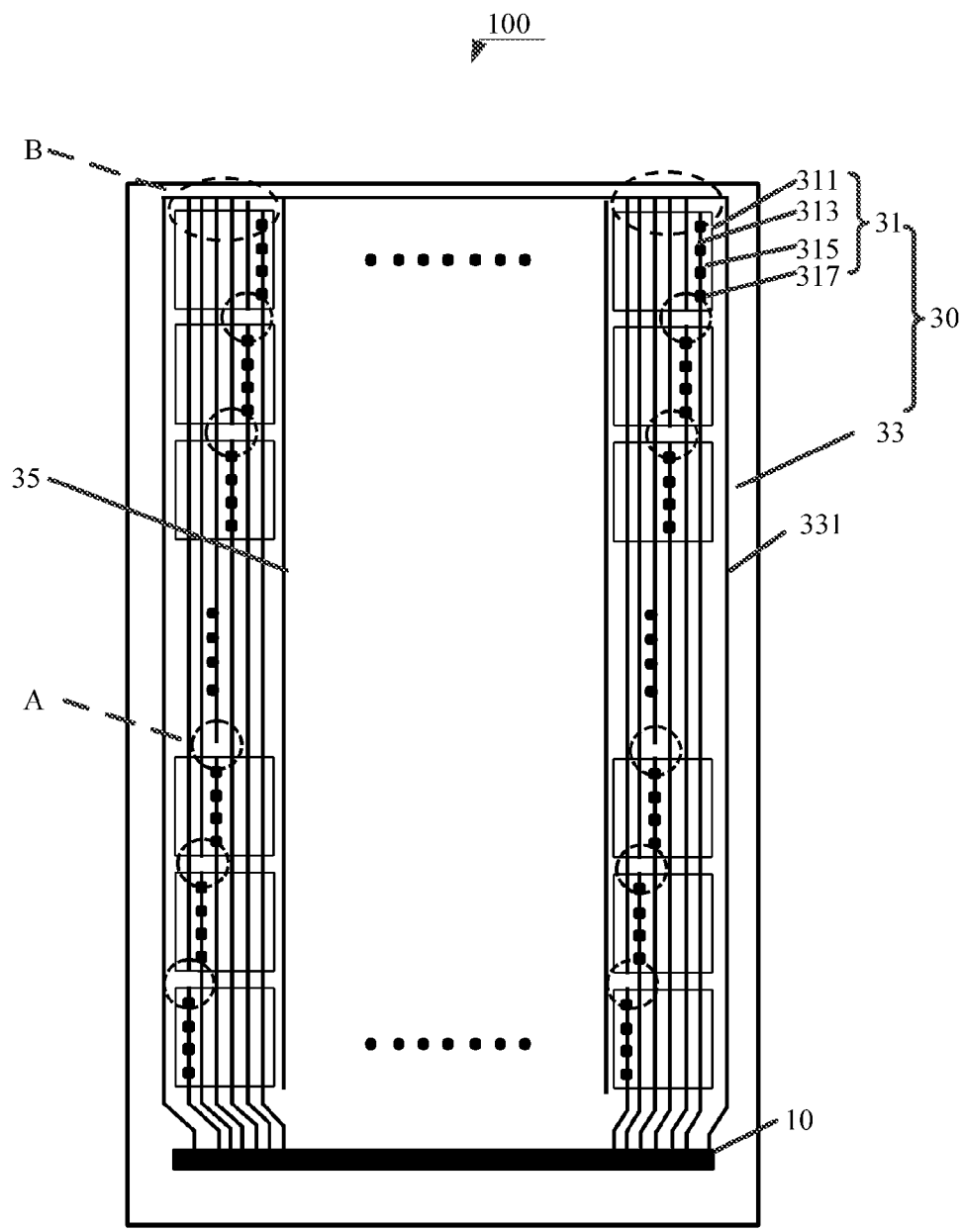

TOUCH CONTROL STRUCTURE AND LIQUID CRYSTAL DISPLAY HAVING THE TOUCH CONTROL STRUCTURE

CROSS REFERENCE

This application claims the priority of Chinese Patent Application No. 201510584850.5, entitled "Touch control structure and liquid crystal display having the touch control structure", filed on Sep. 15, 2015, the disclosure of which is incorporated herein by reference in its entirety.

FIELD OF THE INVENTION

The present invention relates to a display skill field, and more particularly to a touch control structure and a liquid crystal display having the touch control structure.

BACKGROUND OF THE INVENTION

With the development of the terminal technology, the display with touch control function has been gradually become the main stream display applied in kinds of mobile terminals. In prior art, by introducing the in cell touch technology, the touch control elements can be integrated in the display panel to make the display panel itself possess the touch control function, and thus to develop the in cell touch control display panel. However, the components of such touch control display panel are more and the process is complicated. Thus, the material cost is high and has difficulty to realize the demands of thinness. Besides, the in cell touch control display panel directly embeds the touch control function inside and the additional lamination and assembly with a touch control panel is no longer required, the entire screen can be lighter and thinner. Nevertheless, the design of the routing in the touch panel of the in cell touch control display panel directly influences the RC loading, and then influences the touch sensitivity of the entire panel. Therefore, reducing the RC loading of the touch control panel has been always the effort direction of the designers.

SUMMARY OF THE INVENTION

The present invention provides a touch control structure and a liquid crystal display having the touch control structure, which can shorten the routing of each touch control unit to reduce the loading of the routing of each touch control unit for raising the sensitivity of each touch control unit.

On one hand, the present invention provides a touch control structure, applied in a liquid crystal display, wherein the touch control structure comprises a touch control zone, and the touch control zone comprises touch control units and first lead wires corresponding to the touch control units, and the touch control units are arranged in array having a plurality of column of the touch control units, and the touch control units of each column are aligned in spaces from top to bottom in the touch control structure, and the first lead wires sequentially penetrate the touch control units in each column from top to bottom in the touch control structure, and the first lead wire is electrically coupled to one touch control unit, and is disconnected with the next touch control unit, which is adjacent to the touch control unit in the same column and close to the top of the touch control structure.

The first lead wires in each column are equally spaced and aligned in parallel, wherein the first lead wire is coupled to the touch control unit at the bottom end of the touch control structure, and is disconnected with the next touch control unit, which is adjacent in the same column and close to the top, and the second lead wire is coupled to the next touch control unit, and is disconnected with the next touch control unit, which is adjacent in the same column and close to the top, and the last lead wire in each column is coupled to the touch control unit at the top end of the touch control structure.

The touch control structure further comprises a peripheral zone surrounding the touch control zone, and the peripheral zone comprises a second lead wire, and the first lead wire electrically coupled to the touch control unit at the top end of the touch control structure is disconnected with the second lead wire, rest first lead wires are all electrically coupled to the second lead wire.

The touch control structure further comprises a third lead wire, and the third lead wire is positioned between the touch control units of two columns adjacent to each other, and one end of the third lead wire is electrically coupled to the second lead wire, and the other end extends to the bottom end of the touch control structure, and is in a disconnected state.

Each touch control unit comprises a touch control electrode, and the touch control electrode is positioned at an outer layer of the touch control unit, and the first lead wire is electrically coupled to each touch control electrode with a through hole.

On the other hand, the present invention provides a liquid crystal display, comprising an integrated circuit and a touch control structure electrically coupled to the integrated circuit, and the integrated circuit provides signals required for work of the touch control structure, wherein the touch control structure, applied in a liquid crystal display, wherein the touch control structure comprises a touch control zone, and the touch control zone comprises touch control units and first lead wires corresponding to the touch control units, and the touch control units are arranged in array having a plurality of column of the touch control units, and the touch control units of each column are aligned in spaces from top to bottom in the touch control structure, and the first lead wires sequentially penetrate the touch control units in each column from top to bottom in the touch control structure, and the first lead wire is electrically coupled to one touch control unit, and is disconnected with the next touch control unit, which is adjacent to the touch control unit in the same column and close to the top of the touch control structure.

The first lead wires in each column are equally spaced and aligned in parallel, wherein the first lead wire is coupled to the touch control unit at the bottom end of the touch control structure, and is disconnected with the next touch control unit, which is adjacent in the same column and close to the top, and the second lead wire is coupled to the next touch control unit, and is disconnected with the next touch control unit, which is adjacent in the same column and close to the top, and the last lead wire in each column is coupled to the touch control unit at the top end of the touch control structure.

The touch control structure further comprises a peripheral zone surrounding the touch control zone, and the peripheral zone comprises a second lead wire, and the first lead wire electrically coupled to the touch control unit at the top end of the touch control structure is disconnected with the second lead wire, rest first lead wires are all electrically coupled to the second lead wire.

The touch control structure further comprises a third lead wire, and the third lead wire is positioned between the touch control units of two columns adjacent to each other, and one end of the third lead wire is electrically coupled to the second lead wire, and the other end extends to the bottom end of the touch control structure, and is in a disconnected state.

Each touch control unit comprises a touch control electrode, and the touch control electrode is positioned at an outer layer of the touch control unit, and the first lead wire is electrically coupled to each touch control electrode with a through hole.

Both the first lead wire and the second lead wire are coupled to the integrated circuit to receive the signals transmitted by the integrated circuit.

The signal comprises a voltage signal of a constant voltage signal provided for the touch control structure in a display stage; a pulse signal, of which the constant voltage signal is as the base, provided for the touch control structure in a touch control stage.

Compared with prior art, the liquid crystal display having the touch control structure described in the embodiment of the present invention ensures the uniform distribution of the electrical field of the entire touch control structure. Meanwhile, in the touch control structure described in the present invention, the first lead wires are coupled to the corresponding touch control units, and are disconnected with the next touch control unit adjacent thereto. It does not only shorten the routing distance of each touch control unit but also reduce the loading of the routing of each touch control unit. Accordingly, the sensitivity of each touch control unit is raised.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

FIG. 1 is a diagram of a liquid crystal display having a touch control structure according to the embodiment of the present invention.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Besides, the following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In the description of the invention, which needs explanation is that the term "installation", "connected", "connection" should be broadly understood unless those are clearly defined and limited, otherwise, For example, those can be a fixed connection, a detachable connection, or an integral connection; those can be a mechanical connection, or an electrical connection; those can be a direct connection, or an indirect connection with an intermediary, which may be an internal connection of two elements. To those of ordinary skill in the art, the specific meaning of the above terminology in the present invention can be understood in the specific circumstances.

Besides, in the description of the present invention, unless with being indicated otherwise, "plurality" means two or more. In the present specification, the term "process" encompasses an independent process, as well as a process that cannot be clearly distinguished from another process but yet achieves the expected effect of the process of interest. Moreover, in the present specification, any numerical range expressed herein using "to" refers to a range including the numerical values before and after "to" as the minimum and maximum values, respectively. In figures, the same reference numbers will be used to refer to the same or like parts.

Please refer to FIG. 1. FIG. 1 is a partial circuit diagram of the liquid crystal display having the touch control structure according to the present invention. AS shown in FIG. 1, the liquid crystal display 100 comprises an integrated circuit (IC) 10 and a touch control structure 30 electrically coupled to the integrated circuit 10. The integrated circuit 10 provides the touch control structure 30 the function signals required for the work thereof. For example, the signal comprises a voltage signal of a constant voltage signal provided for the touch control structure 30 in a display stage; a pulse signal, of which the constant voltage signal is as the base, provided for the touch control structure 30 in a touch control stage.

The touch control structure 30 is positioned at one side of the integrated circuit 10. Preferably, in the embodiment of the present invention, the one end of the touch control structure 30 close to the integrated circuit 10 is defined to be the bottom end, and the one end away from the integrated circuit 10 is defined to be the top end.

The touch control structure 30 comprises a touch control zone 31 and a peripheral zone 33 surrounding the touch control zone 31. The touch control zone 31 comprises a plurality of touch control units 311 and first lead wires 313 corresponding to the touch control units 311. The plurality of touch control units 311 are arranged in array to form the touch control zone 31. The touch control unit 311 has a plurality of column of the touch control units 311 which are vertically aligned. In the preferred embodiment of the present invention, two columns of touch control units 311 at two sides of the touch control structure 30 are illustrated for description.

The touch control units 311 of each column are aligned on the same straight line and equally spaced from top to bottom to be sequentially aligned at one side of the integrated circuit 10. The touch control units 311 of each column are electrically coupled to the integrated circuit 10 with the first lead wires 313. In the preferred embodiment of the present invention, each touch control unit 311 comprises a touch control electrode 315, and the touch control electrode 315 is positioned at an outer layer of the touch control unit 311, and the first lead wire 313 is electrically coupled to each touch control electrode 315 with a through hole 317. The through hole 317 is positioned on the touch control unit 311. Preferably, the alignment direction of the through holes 317 are the same as the routing direction of the first lead wire 313. It is understandable that the touch control units 311 of each column also can be unequally, non-uniformly spaced aligned at the one side of the integrated circuit 10.

In the embodiment of the present invention, the first lead wires 313 in each column are equally spaced and aligned in parallel, wherein one first lead wire 313 is electrically coupled to the corresponding touch control unit 311 to achieve the single control of the signal to each first lead wire 313. Specifically, in the embodiment of the present invention, the first lead wires 313 in each column comprise six first lead wires 313 equally spaced and aligned in parallel from left to right, which can be sequentially defined to be a first strip of first lead wire 313, a second strip of first lead wire 313, a third strip of first lead wire 313, a fourth strip of first lead wire 313, a fifth strip of first lead wire 313 and a sixth strip of first lead wire 313.

Specifically, the first strip of first lead wire 313 is electrically coupled to the touch control unit 311 at the bottom end of the touch control structure 30 with the through hole 317, and after being disconnected with the next touch control unit 311, which is adjacent thereto and close to the top, it extends to the touch control unit 311 at the top end of the touch control structure 30; the second strip of first lead wire 313 extends from the touch control unit 311 at the bottom end to the next touch control unit 311, and is electrically coupled to the touch control unit 311 with the through hole 317, and after being disconnected with the next touch control unit 311, which is adjacent thereto and close to the top, it extends to the touch control unit 311 at the top end, and so on until the sixth strip of first lead wire 313 at the most right side extends from the touch control unit 311 at the bottom end to the touch control unit 311 at the top end of the touch control structure 30, and is electrically coupled to the touch control unit 311 at the top end with the through hole 317. The disconnected state of the first lead wire 313 and the next touch control unit 311 which is adjacent and close to the top is shown in a dot line circle A in FIG. 1. That is to say, the first lead wire 313 electrically coupled to one touch control unit 311 with the through hole 317 forms a disconnected point shown in the dot line circle A in FIG. 1 with the next touch control unit 311, which is adjacent in the same column and close to the top of the touch control structure 30.

The plurality of first lead wires 313 of the present invention penetrate the entire touch control zone 31 from top to bottom to ensure the uniform distribution of the electrical field of the entire touch control structure 30. Meanwhile, in the touch control structure 30 of the present invention, after the first lead wire 313 electrically coupled to the corresponding touch control unit 311 with the through hole 317, it is disconnected with the next touch control unit 311 which adjacent thereto. It does not only shorten the routing of each touch control unit 311 drew out from the integrated circuit 10 but also reduces the loading coupling to the routing of each touch control unit 311 for raising the sensitivity of each touch control unit 311.

The peripheral zone 33 comprises a second lead wire 331, and the second lead wire 331 surrounds the touch control zone 31. The last strip of first lead wire 313 (the sixth strip of first lead wire 313 at the most right side shown in FIG. 1), which is the first lead wire 313 electrically coupled to the touch control unit 313 at the top end is disconnected with the second lead wire 331, and the rest first lead wires 313 are all electrically coupled to the second lead wire 331. The disconnected state of the first lead wire 313 and the second lead wire 331 is shown in a dot line circle B in FIG. 1. The end of the second lead wire 331 is coupled to the integrated circuit 10 to receive the signals transmitted by the integrated circuit 10.

The touch control structure 30 further comprises a third lead wire 35, and the third lead wire 35 is positioned between the touch control units 311 of two columns adjacent to each other for preventing the signal interference between the touch control units 311 of adjacent columns. One end of the third lead wire 35 is electrically coupled to the second lead wire 331, and the other end extends to the bottom end of the touch control structure 30 and close to the integrated circuit 10, and is in a disconnected state with the integrated circuit 10.

It is understandable that the touch control structure shown in FIG. 1 is merely one embodiment of the present invention. The touch control units and the corresponding first lead wires are not limited to those shown in FIG. 1. In other embodiment, the disconnected points shown in the dot line circle A shown in FIG. 1 can be distributed in other arrangements. For instance, the first strip of first lead wire passes the through hole but not restricted to be electrically coupled to the touch control unit at the bottom end of the touch control structure. Or, it can be electrically coupled to any other touch control unit of the touch control structure. Accordingly, the distribution different from the dot line circle A shown in FIG. 1 can be formed. Besides, the present invention is not restricted that the last strip of first lead wire 313 (the sixth strip of first lead wire 313 at the most right side shown in FIG. 1) is disconnected with the second lead wire 331. In other embodiment, the only thing has to be ensured is that the first lead wire electrically coupled to the touch control unit at the top end is in a disconnected state with the second lead wire.

In conclusion, the liquid crystal display 100 having the touch control structure 30 described in the embodiment of the present invention ensures the uniform distribution of the electrical field of the entire touch control structure 30. Meanwhile, in the touch control structure 30 described in the present invention, the first lead wires 313 are coupled to the corresponding touch control units 311, and are disconnected with the next touch control unit 311 adjacent thereto. It does not only shorten the routing distance of each touch control unit 311 but also reduce the loading of the routing of each touch control unit 311. Accordingly, the sensitivity of each touch control unit 311 is raised.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

Above are embodiments of the present invention, which does not limit the scope of the present invention. Any modifications, equivalent replacements or improvements within the spirit and principles of the embodiment described above should be covered by the protected scope of the invention.

What is claimed is:
1. A touch control structure, applied in a liquid crystal display, wherein the touch control structure comprises a touch control zone, which comprises touch control units and first lead wires respectively corresponding to the touch control units, wherein the touch control units are arranged in an array having a plurality of columns of the touch control units, and the touch control units of each column are arranged, in a manner of being spaced from each other at intervals, in a first predetermined direction from top to bottom of the touch control structure, such that the first lead wires corresponding to the touch control units of column extend from the top to the bottom of the touch control structure and across each of the touch control units of the column, and each of the first lead wires has a first portion that extends to the bottom of the touch control structure and is electrically coupled to the corresponding one of touch control unit and a second portion that is spaced from the first portion and is disconnected from the corresponding one of the touch control units and extends from one of the touch control units of the column, which is next to the corresponding one of the touch control units of the column in a second direction that is opposite to the first direction, to the top of the touch control structure, wherein the touch control structure further comprises a peripheral zone surrounding the touch control zone and comprising a second lead wire, and each of the first lead wires in each column of touch control units includes a first portion electrically coupled to one of the touch control units and one of the first lead wires in each column of touch control units includes a break between the first portion and the second lead wire, and all the other of the first lead wires in each column of touch control units include a second portion that is electrically coupled to the second lead wire and a break that electrically disconnects the first portion from the second portion.

2. The touch control structure according to claim 1, wherein the first lead wires of each column of touch control units are equally spaced and arranged parallel to each other, wherein a first one of the first lead wires is coupled to a bottom one of the touch control units that is located at the bottom of the touch control structure and is disconnected with a first next one of the touch control units that is immediately next to the bottom one of the touch control units in the second direction, and a second one of the first lead wires is coupled to the first next one of touch control units and is disconnected with a second next one of the touch control units, which is immediately next to the first next one of the touch control units in the second direction, and a last one of the first lead wires is coupled to a top one of the touch control units that is located at the top of the touch control structure.

3. The touch control structure according to claim 1, wherein the touch control structure further comprises a third lead wire, which is arranged between the touch control units of two adjacent ones of the plurality of columns adjacent to each other, such that one end of the third lead wire is electrically coupled to the second lead wire and an opposite end of the third lead wire extends to a location adjacent to but spaced from and thus disconnected from the bottom of the touch control structure.

4. The touch control structure according to claim 1, wherein each of the touch control units comprises a touch control electrode, which is positioned on the touch control unit, and the first lead wire corresponding to the touch control unit is electrically coupled to the touch control electrode through a through hole.

5. A liquid crystal display, comprising an integrated circuit and a touch control structure electrically coupled to the integrated circuit, the integrated circuit supplying signals to the touch control structure for operation of the touch control structure, wherein the touch control structure comprises a touch control zone, which comprises touch control units and first lead wires respectively corresponding to the touch control units, wherein the touch control units are arranged in an array having a plurality of columns of the touch control units, and the touch control units of each column are arranged, in a manner of being spaced from each other at intervals in a first predetermined direction from top to bottom of the touch control structure, such that the first lead wires corresponding to the touch control units of column extend from the top to the bottom of the touch control structure and across each of the touch control units of the column, and each of the first lead wires has a first portion that extends to the bottom of the touch control structure and is electrically coupled to the corresponding one of touch control unit and a second portion that is spaced from the first portion and is disconnected from the corresponding one of the touch control units and extends from one of the touch control units of the column, which is next to the corresponding one of the touch control units of the column in a second direction that is opposite to the first direction, to the top of the touch control structure, wherein the touch control structure further comprises a peripheral zone surrounding the touch control zone and comprising a second lead wire, and each of the first lead wires in each column of touch control units includes a first portion electrically coupled to one of the touch control units and one of the first lead wires in each column of touch control units includes a break between the first portion and the second lead wire, and all the other of the first lead wires in each column of touch control units include a second portion that is electrically coupled to the second lead wire and a break that electrically disconnects the first portion from the second portion.

6. The liquid crystal display according to claim 5, wherein the first lead wires of each column of touch control units are equally spaced and arranged parallel to each other, wherein a first one of the first lead wires is coupled to a bottom one of the touch control units that is located at the bottom of the touch control structure and is disconnected with a first next one of the touch control units that is immediately next to the bottom one of the touch control units in the second direction, and a second one of the first lead wires is coupled to the first next one of touch control units and is disconnected with a second next one of the touch control units, which is immediately next to the first next one of the touch control units in the second direction, and a last one of the first lead wires is coupled to a top one of the touch control units that is located at the top of the touch control structure.

7. The liquid crystal display according to claim 6, wherein the signals comprise a voltage signal that supplies a constant voltage signal to the touch control structure in a displaying stage and supplies a pulse signal based on the constant voltage signal to the touch control structure in a touch control stage.

8. The liquid crystal display according to claim 5, wherein the touch control structure further comprises a third lead wire, which is arranged between the touch control units of two adjacent ones of the plurality of columns adjacent to each other, such that one end of the third lead wire is electrically coupled to the second lead wire and an opposite end of the third lead wire extends to a location adjacent to but spaced from and thus disconnected from the bottom of the touch control structure.

9. The liquid crystal display according to claim 5, wherein each of the touch control units comprises a touch control electrode, which is positioned on the touch control unit, and the first lead wire corresponding to the touch control unit is electrically coupled to the touch control electrode through a through hole.

10. The liquid crystal display according to claim 5, wherein both the first lead wires and the second lead wire are coupled to the integrated circuit to receive the signals supplied from the integrated circuit.

11. The liquid crystal display according to claim 5, wherein the signals comprise a voltage signal that supplies a constant voltage signal to the touch control structure in a displaying stage and supplies a pulse signal based on the constant voltage signal to the touch control structure in a touch control stage.

* * * * *